Patented May 27, 1924.

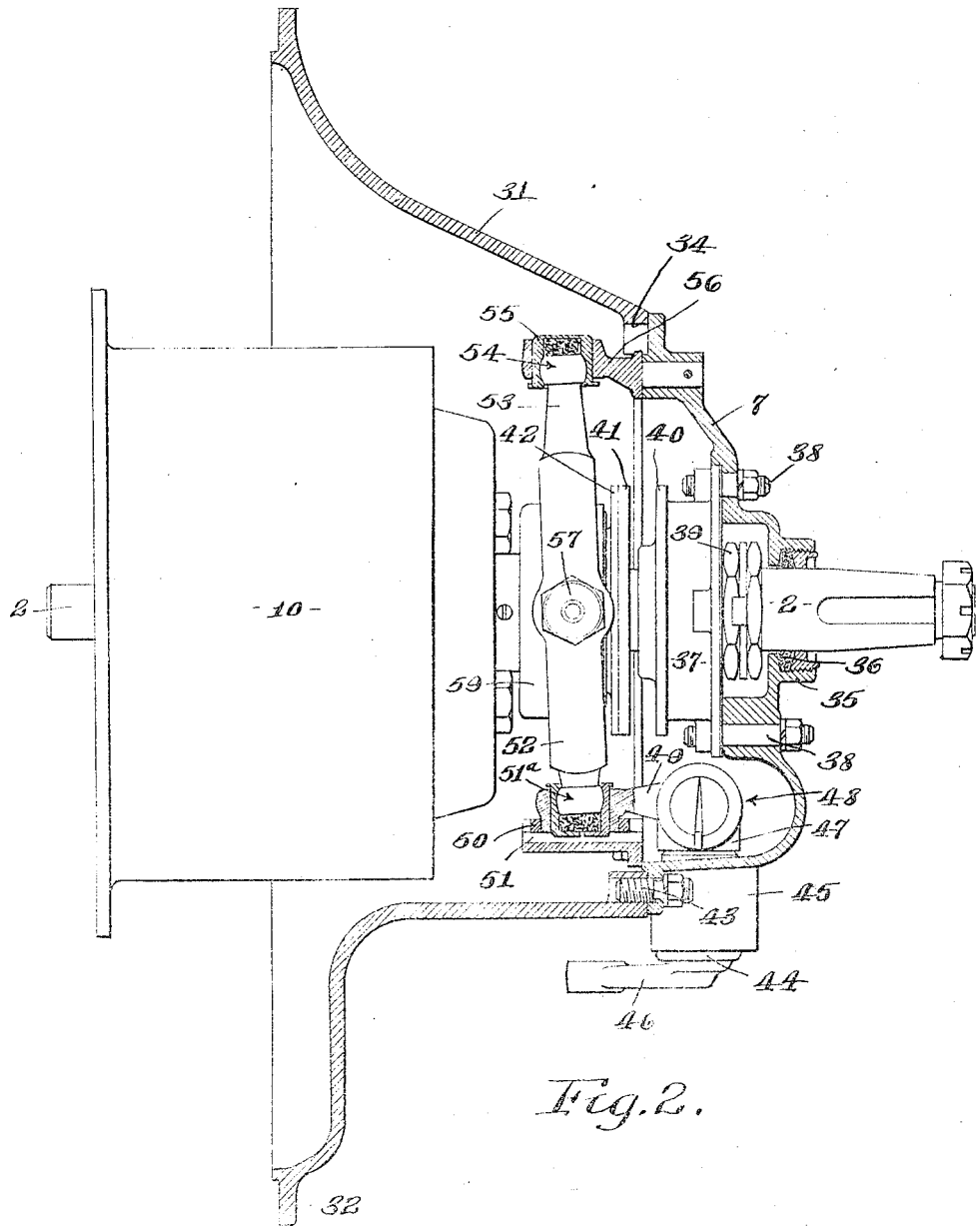

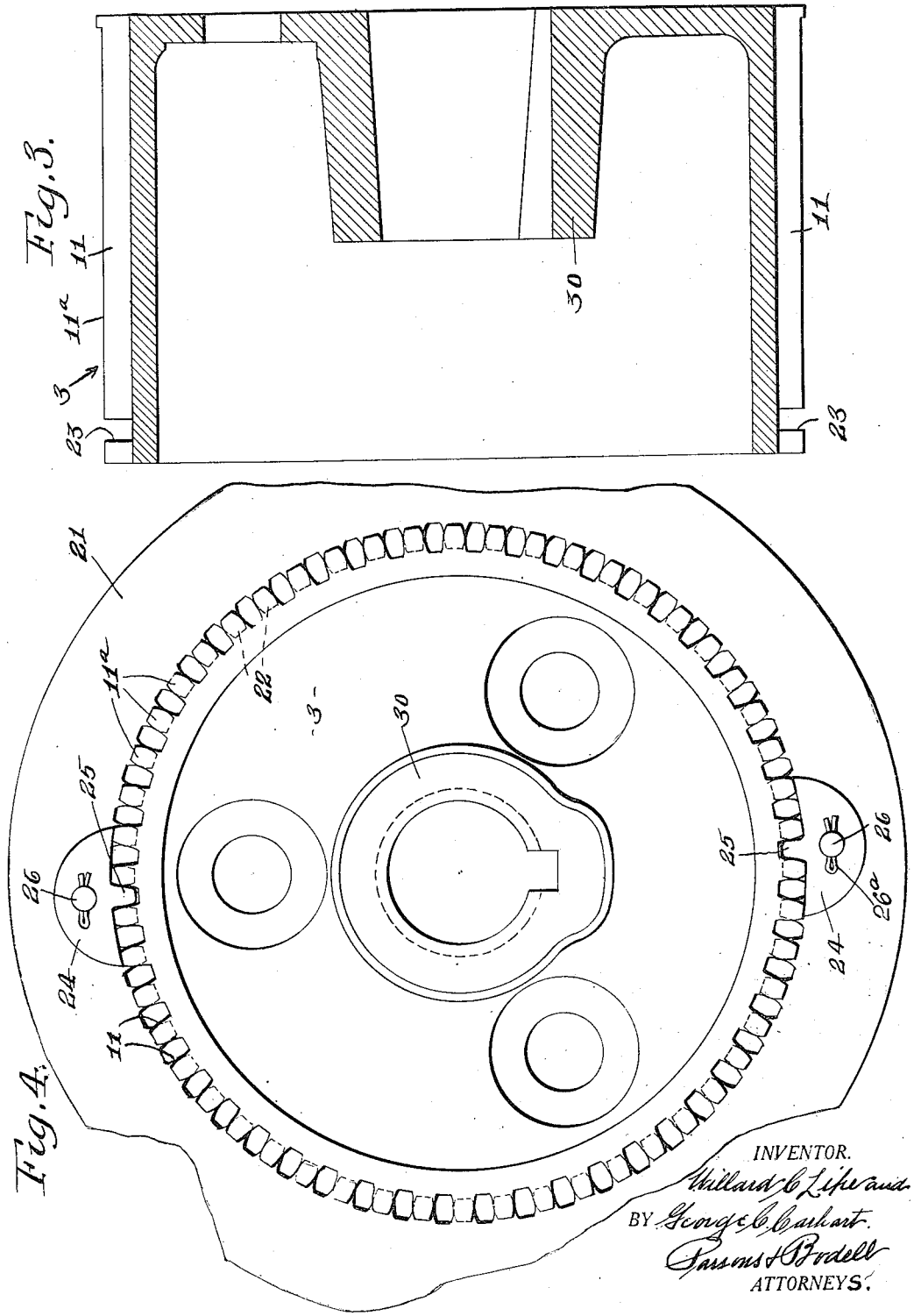

1,495,604

UNITED STATES PATENT OFFICE.

WILLARD C. LIPE AND GEORGE C. CARHART, OF SYRACUSE, NEW YORK, ASSIGNORS TO THE BROWN-LIPE GEAR COMPANY, OF SYRACUSE, NEW YORK, A CORPORATION OF NEW YORK.

SELF-CONTAINED CLUTCH.

Application filed March 3, 1920. Serial No. 362,933.

*To all whom it may concern:*

Be it known that we, WILLARD C. LIPE and GEORGE C. CARHART, citizens of the United States, and residents of Syracuse, in the county of Onondaga and State of New York, have invented a certain new and useful Self-Contained Clutch, of which the following is a specification.

This invention relates to clutches, such as are used in motor vehicles between the engine and the transmission gear and has for its object a particularly simple, efficient and durable clutch construction by which the clutch and its operating mechanism can be installed and removed as a unit and adjusted for the proper working thereof while the clutch is detached or before the same is installed in the motor vehicle.

The invention consists in the novel features and in the combinations and constructions hereinafter set forth and claimed.

In describing this invention, reference is had to the accompanying drawings in which like characters designate corresponding parts in all the views.

Figure 2 is an elevation of parts seen in Fig. 1.

Figure 3 is a detail sectional view of the drum.

Figure 4 is an end elevation looking to the right in Fig. 3, the abutment ring and lock therefor being shown.

Figure 1:
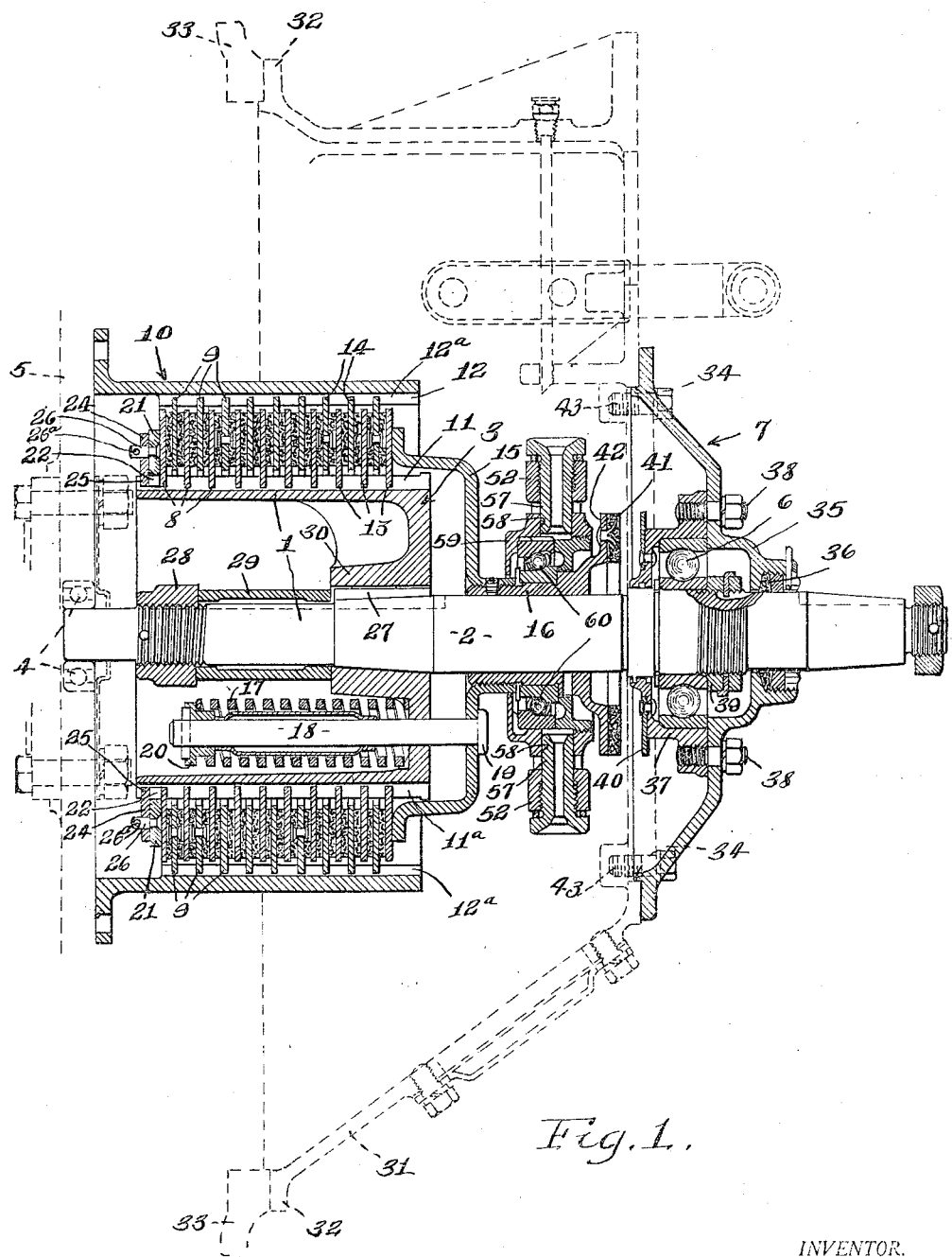
Figure 1 is a vertical sectional view of a clutch construction embodying my invention.

This clutch construction comprises a main element and driving and driven friction members or plates supported by the main element and removable and replaceable as a unit therewith, operating mechanism, and a support for the operating mechanism mounted on the main element, all whereby the clutch can be assembled as a unit and installed in and removed from the vehicle as a unit.

We have here shown our invention as embodied in a disk clutch and the main element is the driven member of the clutch which is located within, and concentric with, the driving element of the clutch mounted on and rotatable with the drive shaft or fly wheel of the engine of the vehicle.

1 designates the driven element as a whole, the same including a shaft 2, a drum 3 mounted on the shaft and rotatable therewith, the shaft being journaled at one end in bearings 4 in the fly wheel 5 and at its other end in bearings 6 in a cover 7 of the housing for the clutch. The shaft 2 is provided with means at its outer end for connection to another shaft or to a universal joint as will be understood by those skilled in the art.

8 and 9 are respectively sets of friction plates or interleaved disks, these disks being supported on the drum 3 and one set as 8 being interlocked with the drum and the other set with the driving member 10 as a drum or cylinder secured in any suitable manner to the fly wheel 5.

As here shown the periphery of the drum 3 and the internal face of the driving drum 10 are formed with lengthwise grooves 11, 12 in which are arranged tongues 13 and 14 provided respectively on the disks or plates 8, 9 these tongues interlocking the disks 9 with the driving element 10 and the disks 8 with the driven element 3 whereby motion is transmitted from the driving to the driven element when the disks are compressed or frictionally engaged. The grooves 11 or 12 are usually arranged close together so that the drum is practically provided with external gear teeth 11$^a$ and the drum 10 with internal gear teeth 12$^a$.

The disks are pressed together by a compressing member 15 carried by a sleeve or hub 16 shiftable axially on the shaft 2 and moved in one direction to compress the disks by means of a plurality of springs as 17 each encircling a pin 18 which is connected at 19 to the compressing member 15 and extends through the head of the drum 3 into the interior of the drum, said springs pressing at one end against the head of the drum and at their other ends against heads 20 provided on the pins 18. The springs 17 normally tend to hold the disks compressed. The member 15 compresses the disks against an abutment at the inner or left hand end of the member 3 and this abutment is carried by the driven element 1, or by the drum 3 movable therewith. It is also constructed to be readily removable for the purpose of removing the disks or plates 8, 9 from the drum 3.

In the illustrated form of our invention this abutment comprises a ring 21 having internal gear teeth 22 for entering the grooves 11 and for interlocking upon a partial turn of the ring 21 in notches 23 provided in the gear teeth 11ª on the periphery of the drum 3. When the teeth 22 are in notches 23, obviously the abutment ring is held from axial movement. The abutment ring is locked from turning in any suitable manner, and as here shown it is locked by a member or members 24 having one or more teeth 25 for entering the grooves 11 of the driven member 3, and means for locking the member or members 24 to the abutment ring, this means being here shown as a pin or post 26 projecting from the abutment ring 21 through the openings in the members 24, the post being provided with a hole for receiving a transverse pin 26ª or key which prevents the locking member 24 from axial movement.

The shaft 2 is secured to the frame or head 3 by means of a key 27 and by means of a nut 28 threading on the end of the shaft 2 against a sleeve 29 interposed between the nut and the hub 30 of the hub or drum 3.

31 is the housing which encloses the clutch mechanism and which is bolted at 32 to the crank case of the engine 33, said housing having an opening 34 therein concentric with the shaft 2 and of as great or slightly greater diameter than the disks 9 including the tongues 14 thereon, this opening being closed by the cover 7 which carries the bearing 6 for the shaft 2.

The operating means for the clutch, that is, the means by which the compression member 15 is actuated against the action of the springs 17 to release the disks, is carried by this cover 7 which constitutes a support for the operating means. Hence the driven member with the operating means can be removed as a unit with the cover 7 and any adjustments may be made before the clutch is installed in the motor vehicle.

As here shown, the cover 7 is formed with a hub 35 on the shaft 2 in which a packing 36 is located, and the bearing 6 which is a ball bearing, including inner and outer rings is held within a cup shaped part 37 secured to the inner side of the cover 7 by screws 38, the inner ring of the bearing thrusting against a nut 39 threading on the shaft 2. A friction plate 40 is carried upon the inner end of the cup 37 and coacts with a brake surface 41 carried by a flange or disk 42 on the inner end of the hub 16 of the compressing member 15. The brake disk 41 coacts with the friction disk 40 to stop the rotation of the driven member after the disks have been separated by the operating means to be presently described. The cover 7 is detachably secured in position by any suitable means as screws 43.

The operating means as before stated is carried by the cover 7, and as here shown, includes a rock shaft 44 journaled in the bearing 45 in the cover and having rock arms 46 and 47 at its inner and outer ends, the former being connected to a clutch pedal not shown, and the latter being connected by means of a joint 48 provided on a link 49 which is connected to a slide 50 movable along a guide 51 carried on and projecting inwardly from the inner face of the cover, the slide 50 being connected by a universal joint 51ª to one end of a lever as a yoke or ring 52 connected to the compressing member 15 and having an arm 53 located diametrically opposite the joint 51 and also formed with a joint 54 fulcrumed in the socket 55 on a bracket 56 carried by the cover 7, the bracket 56 projecting inwardly from the cover. As the lever 52 and the parts with which it coacts are located at the inner side of the cover entirely in front of the inner face of the cover, and hence are not enclosed by the cover but by the rear end of the housing 31, when the clutch is in the housing, said lever and parts are easily accessible for adjustment etc. when the clutch and cover are removed as a unit. This and the self contained structure are features of our invention, and are particularly advantageous when compared with other clutch structures embodied in motor vehicles in which the housing similar to 31 but unprovided with a cover as 7 is used, or in which the operating parts corresponding to the lever 52 and associated parts are supported partly or wholly by a housing having a cover similar to the cover 7. The housing as 31 is not readily removable as the steering gear in motor vehicles interferes with its ready removal and when removed the operating mechanism is not accessible as it is located in the narrow rear end of the housing behind the clutch disks. To make the operating mechanism accessible it must be demounted from the housing. The joint 48 is a ball and socket joint substantially like the joint 51ª, the ball being arranged at the end of the rock arm 47, and the socket carried in a bearing or ring at the end of the link 49.

The ring 52 is formed with suitable trunnions 57 which axis in the openings 58 formed in a collar 59 mounted on the hub of the compressing member 15 to shift the same axially, the hub being rotatably mounted in the collar.

A bearing 60 is interposed between the ring 59 and hub 16. The construction, per se of the operating mechanism forms no part of this invention and it is sufficient to say that upon the rocking of the shaft 44, the yoke 52, which is in effect a lever, will be moved on its fulcrum point or joint 54 and shift the compressing member 15 to the right to release the disk.

All this operating mechanism is carried by the cover 7 and as the clutch is a self-contained structure, said clutch can be adjusted as to the tension of the friction plates and other adjustments before being placed or installed in the vehicle, and to install the clutch the shaft 2 and parts carried thereby are moved through the opening 34 of the housing and the tongues 14 of the disks 9 moved endwisely into the grooves 12 of the drum 10 on the fly wheel. At the same time the end of the shaft 2 is moved into the bearings 4.

The cover 7 is then bolted in position, the bearings 6 and nut 39 taking the end thrust. The clutch pedal or link is then connected in any suitable manner to the rock arm 46 and the clutch is ready to operate. To remove the clutch it is only necessary to disconnect the clutch pedal from the arm 46, remove the screws 43 whereupon the shaft 2 with the cover 7 thereon, drum 3 and disks 8 and 9 can be removed as a unit.

To remove the disks the locking members 24 are removed, thus permitting the ring 21 to be given a partial turn until the teeth 22 thereon move out of the notches 23 in the teeth of the drum 3, so that the ring can be removed by an axial movement, and so that the disks 8, 9 can be removed by an axial movement.

What we claim is:

1. In a clutch, an axially shiftable element, means for controlling said element, and a casing including a removable portion, said means comprising a lever coacting with the shiftable element and fulcrumed at one end to the removable portion of the casing, and an operating member, also carried by the removable portion of the casing and removable therewith and coacting with the lever, substantially as and for the purpose specified.

2. In a clutch, the combination of driving and driven elements, one being shiftable and detachable axially from the other by movement in an axial direction, and a casing including a removable portion providing a bearing for the removable element, and an operating means for shifting the shiftable element axially in the normal operation of the clutch, said shifting means being carried by the removable portion of the casing, the parts removable with said portion of the casing being located in front of the plane of the front face of said portion whereby the parts are accessible upon demounting said shiftable element, said parts and the portion of the casing as a unit, substantially as and for the purpose described.

3. In a clutch construction, the combination of driving and driven elements, the driven element extending into the driving element and including a shaft, said driven element being detachable axially from the driving element, a housing enclosing said elements and having an opening at its rear end of sufficient size to permit the driven element and associated parts to be moved axially therethrough, a cover for such opening having a bearing for the shaft, operating mechanism for controlling the engaging and disengaging of the clutch, said mechanism being located in the rear of said elements, and including a shifting lever, a fulcrum for the lever carried by the cover and means carried by the cover for actuating the lever, the operating mechanism being carried by the cover on the inner side thereof, and the driving and driven members being located entirely in front of the detachable cover and within the major part of the housing whereby when the cover and the driven element are removed as a unit from the driving element and the housing, the driven element and associated parts and the operating mechanism are accessible, substantially as and for the purpose specified.

4. In a clutch construction, the combination of driving and driven elements, the driven element extending into the driving element and including a shaft, said driven element being detachable axially from the driving element, operating mechanism for controlling the engaging and disengaging of the clutch, said mechanism being located in the rear of said elements, a housing enclosing said elements and associated parts having an opening at its rear end of sufficient size to permit the driven element and associated parts to be moved axially therethrough, and a cover for such opening having a bearing for the shaft, the operating mechanism being carried by the cover on the inner side thereof, and the driving and driven elements being located entirely in front of the detachable cover and within the major part of the housing, whereby when the cover and the driven element are removed as a unit from the driving element and the housing, the driven element and associated parts, and the operating mechanism are accessible, substantially as and for the purpose described.

5. In a clutch construction, the combination of clutch mechanism, including a shiftable member, operating mechanism therefor, and a housing enclosing the major part of the clutch and the operating mechanism, including a cover at the rear end of the housing, said operating mechanism being mounted on and carried by the inner face of the cover, and the clutch mechanism being located entirely in front of the cover, substantially as and for the purpose set forth.

6. In a clutch construction, the combination of clutch mechanism including a shiftable member, and a clutch shaft on which said member slides axially, operating mechanism for controlling the shifting of said member on the shaft, a housing enclosing the major part of the clutch mechanism and the operating mechanism, the housing being open at its rear end, the opening at such rear end being large enough to permit displacement of the clutch mechanism and the operating mechanism axially therethrough, and a detachable cover at the rear end of the housing for such opening, the cover having a bearing on the shaft, and the operating mechanism being carried on the inner face of the cover, substantially as and for the purpose described.

7. In a clutch construction, the combination of clutch mechanism including a shiftable member, operating mechanism therefor and a housing enclosing the major part of the clutch and operating mechanisms including a cover at the rear end of the housing, the operating mechanism including a shifting lever, a guide on the inner face of the cover, and means for actuating the lever, said means being carried by the cover and including a part movable along said guide, substantially as and for the purpose described.

8. In a clutch construction, the combination of clutch mechanism including a shiftable member, operating mechanism therefor, and a housing enclosing the major part of the clutch and operating mechanisms including a cover at the rear end of the housing, the operating mechanism including a shifting lever, a fulcrum for the lever carried by the cover, a guide on the inner face of the cover, and means for actuating the lever, said means being carried by the cover and including a part movable along said guide, substantially as and for the purpose specified.

9. In a clutch construction, the combination of a clutch mechanism including a shiftable member, operating mechanism therefor, and a housing enclosing the major part of the clutch and operating mechanisms including a cover at the rear end of the housing, the operating mechanism including a shifting lever, a fulcrum for the lever carried by the cover, a guide on the inner face of the cover, and means for actuating the lever comprising a rock shaft journaled in the cover and having a rock arm at its inner end, a slide movable along the guide and supporting the lever, and a link connecting the rock arm and the guide, substantially as and for the purpose set forth.

10. In a clutch construction, the combination of a clutch mechanism including a shiftable member, operating mechanism therefor, and a housing enclosing the major part of the clutch and operating mechanisms including a cover at the rear end of the housing, the operating mechanism including a shifting lever, a fulcrum for the lever carried by the cover, and means for actuating the lever comprising a rock shaft journaled in the cover and having a rock arm at its inner end, and a link connecting the rock arm and the lever, substantially as and for the purpose described.

11. In a clutch construction, the combination of outer and inner elements, coacting friction plates between said elements connected respectively thereto, and being carried by the inner element, those connected to the outer element being attachable to and detachable from the outer element upon axial displacement of the inner element, the inner element including a shaft, a compressing member mounted on the shaft and coacting with the plates to compress the same, operating mechanism for the compressing member, a housing enclosing the driving and driven elements and parts carried thereby and having an opening at its rear end of as large diameter as the friction plates, and a cover for such opening having a bearing for the shaft, the operating mechanism being carried on the inner side of the cover, substantially as and for the purpose set forth.

12. The combination of a clutch mechanism comprising substantially coaxial and concentric driving and driven elements, the driving element including a drum and the driven element including a head located within the drum, a shaft extending coaxially of the drum and the head and on which the head is mounted, sets of interleaved friction plates carried by the head and keyed respectively to the inner face of the drum and the periphery of the head, a compressing ring mounted on the shaft and coacting with the plates, means for normally compressing the ring to hold the plates engaged, operating mechanism for releasing the plates, a housing enclosing the driving and driven elements, the shaft and associated parts and having an opening at its rear end of as large diameter as the plates, and a cover for the opening having a bearing for the shaft, the operating mechanism being carried on the inner face of the cover whereby upon detachment of the cover, said cover, driven element and associated parts are removable as a unit through the opening, and the driven element and operating mechanism are located entirely in front of the cover, substantially as and for the purpose described.

13. A friction clutch comprising outer and inner elements formed respectively with internal and external grooves on their opposing surfaces, interleaved disks associated respectively with the inner and outer elements and having tongues for entering the grooves respectively, and an abutment ring on the inner element having teeth for entering the grooves of the inner element, said inner element having notches for receiving the teeth upon a partial turn of the abutment ring, substantially as and for the purpose described.

14. A friction clutch comprising outer and inner elements formed respectively with internal and external grooves on their opposing surfaces, interleaved disks associated respectively with the inner and outer elements and having tongues for entering the grooves respectively, an abutment ring on the inner element having teeth for entering the grooves of the inner element, said inner element having notches for receiving the teeth upon a partial turn of the abutment ring, and means for locking the abutment ring from turning, comprising a member having a tooth for entering the grooves of the inner clutch member, and means for securing said member to the abutment ring, substantially as and for the purpose specified.

In testimony whereof, we have hereunto signed our names, at Syracuse, in the county of Onondaga, and State of New York, this 25th day of February, 1920.

WILLARD C. LIPE.
GEORGE C. CARHART.